(12) United States Patent
Silva et al.

(10) Patent No.: US 6,933,946 B1
(45) Date of Patent: Aug. 23, 2005

(54) METHOD FOR OUT-OF CORE RENDERING OF LARGE 3D MODELS

(75) Inventors: Claudio T. Silva, Portland, OR (US); Wagner T. Correa, Portland, OR (US)

(73) Assignee: AT&T Corp., New York, NY (US)

(*) Notice: Subject to any disclaimer, the term of this patent is extended or adjusted under 35 U.S.C. 154(b) by 47 days.

(21) Appl. No.: 10/431,601

(22) Filed: May 7, 2003

(51) Int. Cl.[7] .............................................. G09G 5/00
(52) U.S. Cl. ...................... 345/582; 345/583; 345/629; 345/649; 345/654; 345/659
(58) Field of Search ................................ 345/582, 583, 345/629, 649, 654, 659

(56) References Cited

U.S. PATENT DOCUMENTS 6,414,680 B1 * 7/2002 Klosowski et al. ......... 345/423

OTHER PUBLICATIONS

Agarwal, P., Arge, L., Procopiuc, O., and Vitter, J. 1999. A framework for index bulk loading and dynamization. In *Proc. of ICALP '01*.

Airey, J. M., Rohlf, J. H., and Frederick P. Brooks, J. 1990. Towards image realism with interactive update rates In complex virtual building environments. *1990 Symposium on Interactive 3D Graphics 24,2* (Mar.), 41–50.

Aliaga, D., Cohen, J., Wilson, A., Zhang, H., Erikson, C., Hoff, K., Hudson, T., St Urzlinger, W., Baker, E., Bastos, R., Whitton, M., Brooks, F., and Manocha, D. 1999. MMR: An interactive massive model rendering system using geometric and image-based acceleration. *1999 ACM Symposium on Interactive 3D Graphics* (Apr.), 199–206.

Arge, L., Hinrichs, K., Vahrenhold, J., and Vitter, J. 1999. Efficient bulk operations on dynamic r–trees in *Proc. Workshop on Algorithm Engineering*.

Avila, L. S., and Schroeder, W. 1997. Interactive visualization of aircraft and power generation engines in *IEEE Visualization '97*, IEEE, 483–486.

Bernardini, F., Mittleman, J., Rushmeier, H., Silva, C., and Taubin, G. 1999. The ball–pivoting algorithm for surface reconstruction. *IEEE Transactions on Visualization and Computer Graphics 5*, 4 (Oct.–Dec.), 349–359. D. R. 1997. *Programming with POSIX Threads*. Addison Wesley.

Chiang, Y.–J., and Silva, C. T. 1997. I/O optimal isosurface extraction. *IEEE Visualization '97* (Nov.) 293–300.

Chiang, Y–J., Silva, C. T., and Schroeder, W. J. 1998. Interactive out–of–core isosurface extraction. *IEEE Visualization '98* (Oct.), 167–174.

Clark, J. H. 1976, Hierarchical geometric models for visible surface algorithms. *Communications of the ACM 19*, 10 (Oct.), 547–554.

Cox, M. B., and Ellsworth, D. 1997. Application–controlled demand paging for out–of–core visualization. *IEEE Visualization '97* (Nov.), 235–244.

Duchaineau, M. A., Wolinsky, M., Sigeti, D. E., Miller, M. C., Aldrich, C., and Mineev–Weinstein, M. B. 1997. ROAMing terrain: Real–time optimally adapting meshes. In *IEEE Visualization '97*, IEEE, 81–88.

El–Sana, J., and Chiang, Y.–J. 2000, External memory view–dependent simplification. *Computer Graphics Forum 19*, 3 (Aug.).

(Continued)

Primary Examiner—Kee M. Tung
Assistant Examiner—Mike Rahmjoo

(57) ABSTRACT

The present invention is a method and system for interactive rendering of large polygonal environments on commodity PC hardware. The system allows a user to walk through a large model at interactive frame rates on machines with limited memory. It works by first creating a hierarchical spatial decomposition of the model on disk using a fast and incremental out-of-core preprocessing algorithm. At running time, the system and method uses an approximate from-point visibility algorithm to dynamically determine which parts of the model to retrieve from disk. Multiple threads and a speculative prefetching algorithm are used to improve frame rates.

18 Claims, 8 Drawing Sheets

OTHER PUBLICATIONS

El-Sana, J., Sokolovsky, N., and Silva, C. T. 2001, Integrating occlusion culling with view-dependent rendering. In *IEEE Visualization 2001*, 371–378.

Funkhouser, T. A., and S'Equin, C. H, 1993. Adaptive display algorithm for interactive frame rates during visualization of complex virtual environments. *Proceedings of SIGGRAPH 93* (Aug.), 247–254.

Funkhouser, T. A., S'Equin, C. H., and Teller, S. J. 1992. Management of large amounts of data in interactive building walkthroughs. *1992 Symposium on Interactive SD Graphics 25*, 2 (Mar.), 11–20.

Funkhouser, T. A. 1996. Database management for interactive display of large architectural models *Graphics Interface '96* (May), 1–8.

Klosowski, J. T., and Silva, C. T. 2000. The prioritized-layered projection algorithm for visible set estimation. *IEEE Transactions on Visualization and Computer Graphics 6*, 2 (Apr.–Jun.), 108–123.

Klosowski, J. T., and Silva, C. T. 2001. Efficient conservative visibility culling using the prioritized-layered projection algorithm. *IEEE Transactions on Visualization and Computer Graphics 7*, 4 (Oct.–Dec.), 365–379.

Lindstrom, P., and Pascucci, V. 2001. Visualization of large terrains made easy. In *IEEE Visualization 2001*, 363–370.

Lindstrom, P., and Silva. C. T. 2001, A memory insensitive technique for large model simplification. In *IEEE Visualization 2001*, 121–126.

Lindstrom, P., Koller, D., Ribarsky, W., Hughes, L. F., Faust, N., and Turner, G. 1996. Real-time, continuous level of detail rendering of height fields. In *Proceedings of SIGGRAPH 96*, ACM SIGGRAPH, 109–118.

Pharr, M., Kolb, C., Gershbein, R., and Hanrahan, P. 1997. Rendering complex scenes with memory-coherent ray tracing. *Proceedings of SIGGRAPH 97* (Aug.), 101–108.

Shen, H.–W., Chiang, L.–J., and Ma, K.–L. 1999. A fast volume rendering algorithm for time–varying fields using a time–space partitioning (TSP) tree, *IEEE Visualization '99* (Oct.), 371–378.

Sutton, P. M., and Hansen, C. D. 2000. Accelerated Isosurface extraction in time–varying fields. *IEEE Transactions on Visualization and Computer Graphics 6*, 2 (Apr.–Jun.), 98–107.

Teller, S. J., and S'Equin, C. H. 1991, Visibility preprocessing for interactive walkthroughs. *Computer Graphics (Proceedings of SIGGRAPH 91) 25*, 4 (Jul.), 61–69.

Ueng, S.–K., Sikorski, C., and Ma, K.–L 1997. Out–of–core streamline visualization on large unstructured meshes, *IEEE Transactions on Visualization and Computer Graphics 3*, 4 (Oct.–Dec.), 370–380.

Wald, I., Slusallek, P., and Benthin, C. 2001. Interactive distributed ray tracing of highly complex models. *Rendering Techniques 2001*, 277–288.

Krishnan, Shankar; Silva, Cláudio T.; and Wei, Bin, A Hardware–Assisted Visibility–Ordering Algorithm With Applications to Volume Rendering, *Data Visualization 2001* at 233–242 (2001).

Klosowski, James T. and Silva, Cláudio T., Efficient Conservative Visibility Culling Using The Prioritized–Layered Projection Algorithm, IEEE Transactions on Visualization and Computer Graphics 7,4 (Oct–Dec. 2001) 365–379.

* cited by examiner

FIG. 3

| sec | #tri (x10^6) | time (min) | total time (min) | total #tri (x10^6) | octree #tri (x10^6) | replic. factor | cont. size (MB) | stract. size (MB) | mem. usage (MB) |
|---|---|---|---|---|---|---|---|---|---|
| 1 | 3.43 | 1.1 | 1.1 | 3.43 | 4.67 | 1.4 | 549 | 0.18 | 61 |
| 2 | 0.16 | 0.2 | 1.3 | 3.59 | 4.90 | 1.4 | 576 | 0.18 | 13 |
| 3 | 0.38 | 0.2 | 1.4 | 3.97 | 5.30 | 1.3 | 624 | 0.21 | 12 |
| 4 | 0.06 | 0.1 | 1.5 | 4.03 | 5.37 | 1.3 | 632 | 0.21 | 9 |
| 5 | 0.22 | 0.1 | 1.7 | 4.25 | 5.65 | 1.3 | 664 | 0.23 | 15 |
| 6 | 0.06 | 0.0 | 1.7 | 4.31 | 5.71 | 1.3 | 671 | 0.23 | 9 |
| 7 | 0.10 | 0.3 | 2.0 | 4.40 | 5.87 | 1.3 | 691 | 0.23 | 29 |
| 8 | 0.15 | 0.2 | 2.2 | 4.56 | 6.03 | 1.3 | 710 | 0.24 | 13 |
| 9 | 0.12 | 0.1 | 2.3 | 4.68 | 6.26 | 1.3 | 737 | 0.25 | 11 |
| 10 | 0.20 | 0.2 | 2.4 | 4.88 | 6.53 | 1.3 | 769 | 0.26 | 20 |
| 11 | 0.13 | 0.2 | 2.7 | 5.01 | 6.72 | 1.3 | 791 | 0.27 | 28 |
| 12 | 0.37 | 0.6 | 3.2 | 5.38 | 7.15 | 1.3 | 841 | 0.28 | 50 |
| 13 | 0.11 | 0.2 | 3.5 | 5.49 | 7.29 | 1.3 | 858 | 0.29 | 22 |
| 14 | 0.25 | 0.2 | 3.7 | 5.74 | 7.74 | 1.3 | 912 | 0.30 | 21 |
| 15 | 1.14 | 1.8 | 5.5 | 6.88 | 13.95 | 2.0 | 1,639 | 0.48 | 107 |
| 16 | 0.37 | 2.6 | 8.1 | 7.25 | 14.85 | 2.0 | 1,747 | 0.51 | 137 |
| 17 | 0.25 | 0.4 | 8.5 | 7.50 | 15.41 | 2.1 | 1,812 | 0.53 | 28 |
| 18 | 0.17 | 0.4 | 8.9 | 7.66 | 15.73 | 2.1 | 1,850 | 0.54 | 27 |
| 19 | 2.65 | 3.8 | 12.7 | 10.32 | 28.25 | 2.7 | 3,320 | 0.87 | 214 |
| 20 | 2.42 | 2.3 | 15.0 | 12.73 | 32.95 | 2.6 | 3,874 | 1.02 | 138 |
| 21 | 0.02 | 1.8 | 16.9 | 12.75 | 33.04 | 2.6 | 3,885 | 1.02 | 98 |

METHOD FOR OUT-OF CORE RENDERING OF LARGE 3D MODELS

FIELD OF THE INVENTION

The present invention relates generally to field of rendering views of large three-dimensional models, and more particularly, to a technique for rendering models too large to fit in core memory.

BACKGROUND OF THE INVENTION

A large model is loosely defined as one that does not fit in main memory. Interactive rendering of large models has applications in many areas (e.g., computer-aided design (CAD), engineering, entertainment, training), and therefore has been the focus of research. There are several different types of large models. Sometimes the model can actually be quite simple, but it is given in a highly over-tessellated representation for the given view. That is often the case for scanned objects, such as the famous Stanford Bunny. After proper simplification, such models can usually be rendered with simple visibility algorithms, such as view-frustum culling. Descriptions of examples include L. S. Avila & W. Schroeder, Interactive Visualization of Aircraft and Power Generation Engines, IEEE Visualization '97 at 483–486 (1997); J. El-Sana, & Y.-J. Chiang, External Memory View-Dependent Simplification, 19 Computer Graphics Forum 3 (August 2000); and P. Lindstrom et al., A Memory Insensitive Technique for Large Model Simplification, IEEE Visualization 2001 at 121–126. (2001). Another important class of large data comes from terrain models, for which an impressive amount of literature is available, such as P. Lindstrom et al., Real-Time, Continuous Level of Detail Rendering of Height Fields, Proceedings of SIGGRAPH 96, ACM SIGGRAPH 109–118 (1996); M. A. Duchaineau, et al., ROAMing Terrain: Real-Time Optimally Adapting Meshes, IEEE Visualization '97, EEE 81–88 (1997); and P. Lindstrom et al., Visualization of Large Terrains Made Easy, IEEE Visualization 2001 at 363–370 (2001). The present application considers the development of techniques for handling large models with high depth complexity, which are not highly over tessellated with respect to normal viewing conditions. For instance, there are several computer models of real-world environments that do not contain significant amounts of over-tessellated geometry (e.g., those used in CAD or computer games). Such models tend to reduce the benefits of level-of-detail techniques, as noted in D. Aliaga et al., MMR: An Interactive Massive Model Rendering System Using Geometric and Image-Based Acceleration, ACM Symposium on Interactive 3D Graphics 199–206 (April 1999). It is therefore important to use more complex visibility culling techniques to avoid the overdrawing of pixels.

Researchers have been interested in rendering large and complex models since the early days of computer graphics. In fact, many of the acceleration techniques we use today were proposed in J. H. Clark, Hierarchical Geometric Models for Visible Surface Algorithms, 19 Communications of the ACM 547–554 (October 1976), including the usage of hierarchical spatial data structures, level-of-detail (LOD) management, hierarchical view frustum and occlusion culling, and working-set management (geometry caching). The idea of exploiting multiprocessor graphics workstations to overlap visibility computations with rendering was first presented in B. J. Garlick, D. R. Baum, & J. M. Winget, Interactive Viewing of Large Geometric Databases Using Multiprocessor Graphics Workstations, SIGGRAPH Course: Parallel Algorithms and Architectures for 3D Image Generation, ACM SIGGRAPH, 239–245 (1990). The system described in J. M. Airey, J. H. Rohif, & J. Frederick P. B., Towards Image Realism with Interactive Update Rates in Complex Virtual Building Environments, 1990 Symposium on Interactive 3D Graphics 24, 241–50 (March 1990) combined LOD management with the idea of precomputing visibility information. The system used point sampling at preprocessing time to approximate from-region visibility computations. Their system, however, assumed the model was composed of axis-aligned polygons.

To the inventors' knowledge, T. A. Funkhouser, C. H. Séquin, & S. J. Teller, Management of Large Amounts of Data in Interactive Building Walkthroughs, 1992 Symposium on Interactive 3D Graphics 25, 2, 11–20 (March 1992) describes the first published system to support models larger than main memory and perform speculative prefetching. That system is based on the from-region visibility algorithm described in S. J. Teller & C. H. Sequin, Visibility Preprocessing for Interactive Walkthroughs, Computer Graphics (Proceedings of SIGGRAPH 91) 25, 4 61–69 (July 1991). Improvements to the original system are proposed in T. A. Funkhouser, & C. H. Séquin, Adaptive Display Algorithm for Interactive Frame Rates During Visualization of Complex Virtual Environments, Proceedings of SIGGRAPH 93 at 247–254 (August 1993) and in T. A. Funkhouser, Database Management for Interactive Display of Large Architectural Models, Graphics Interface '96 at 1–8 (May 1996), but their preprocessing stage remained limited to models made of axis-aligned cells.

The Massive Model Rendering (MMR) system described in D. Aliaga et al., MMR: An Interactive Massive Model Rendering System Using Geometric and Image-Based Acceleration, 1999 ACM Symposium on Interactive 3D Graphics 199–206 (April 1999) introduced the idea of replacing geometry that is far from the user's point of view with textured depth meshes (TDMs). TDMs are image impostors that contain depth information, and are displayed using projective texture mapping. Their system employed an impressive number of acceleration techniques. They note, however, that some of those acceleration techniques may compete with each other. For example, occlusion culling techniques are most effective when the scene has high depth complexity, but replacing geometry with imagery reduces the depth complexity. The inventors believe that that system was the first to handle models with tens of millions of polygons at interactive frame rates. The major disadvantages of that system were the preprocessing times (which were on the order of weeks), the manual user intervention required, and the large SGI multi-processor machines with several gigabytes of main memory. In 2001, the UNC Walkthrough Group made their massive power plant model (The Walkthru Project at UNC Chapel Hill 2001, http://www.cs.unc.edu/geom/Powerplant/) available to the graphics community. As pointed out in Clark, supra, good models "are at least as valuable as the visible surface algorithms that render them."

I. Wald, P. Slusallek, & C. Benthin, Interactive Distributed Ray Tracing of Highly Complex Models, Rendering Techniques 2001 at 277–288 (2001) discloses a system able to generate ray-traced images of large models at interactive frame rates. That system is able to preprocess the UNC power plant model in 2.5 hours, which is two orders of magnitude faster than Aliaga et al., supra. The paper further suggests that the ray tracing system could benefit from using prefetching, because it would probably hide more network latency. Most of the above-described systems use from-region visibility algorithms. The exception is the system described by Wald, which uses ray tracing. That system, however, requires a relatively large number of I/O operations, is too slow for certain applications requiring high frame rates and requires expensive hardware.

Other work in this area is reported in L. S. Avila & W. Schroeder, Interactive Visualization of Aircraft and Power Generation Engines, IEEE Visualization '97 at 483–486 (1997), in J. El-Sana, & Y.-J. Chiang, External Memory View-Dependent Simplification, 19 Computer Graphics Forum 3 (August 2000), and in B.-O. Schneider et al., Brush As a Walkthrough System for Architectural Models, Proc. 5th Eurographics Workshop on Rendering 389–399 (1995). Those systems do not use occlusion culling, which makes them somewhat unsuitable for rendering high depth complexity scenes.

Recently, substantial research has been conducted in the area of out-of-core graphics and visualization. Those efforts include F. Bernardini et al., The Ball-Pivoting Algorithm for Surface Reconstruction, 5 IEEE Transactions on Visualization and Computer Graphics 349–359 (October–December 1999); M. Pharr et al., Rendering Complex Scenes with Memory-Coherent Ray Tracing, Proceedings of SIGGRAPH 97 at 101–108 (August 1997); Y.-J. Chiang et al., I/O Optimal Isosurface Extraction, IEEE Visualization '97 at 293–300 (November 1997); Y.-J. Chiang et al., Interactive Out-of-Core Isosurface Extraction, IEEE Visualization '98 at 167–174 (October 1998); M. Cox et al., Application-Controlled Demand Paging for Out-of-Core Visualization, IEEE Visualization '97 at 235–244 (November 1997); S.-K. Ueng et al., Out-of-Core Streamline Visualization on Large Unstructured Meshes, 3 IEEE Transactions on Visualization and Computer Graphics at 370–380 (October–December 1997); H.-W. Shen et al., A Fast Volume Rendering Algorithm for Time-Varying Fields Using a Time-Space Partitioning (TSP) Tree, IEEE Visualization '99 at 371–378 (October 1999). Those techniques have been developed to cope with models that are too large to fit in main memory. The real-time rendering of large polygonal models, however, has not been addressed by those works.

There is presently a need for a method that renders large, high depth complexity scenes at a frame rate and image quality suitable for walk-through simulation. The method should require reasonable preprocessing time and should run using low-cost, commodity hardware. To the inventors' knowledge, there is currently no method available to fill that need.

SUMMARY OF THE INVENTION

The present invention addresses the needs described above by providing a method for managing a geometry cache for rendering a view of a spatial model from an observer's position. The method includes the steps of fetching geometry based on a from-point visibility algorithm and, simultaneously with the fetching step, prefetching geometry that is identified for prefetching based on a limited field of view from a single point located at the observer's predicted actual position.

The spatial model may include cells containing geometry and having solidity values. In that case, the fetching step includes selecting a cell to be fetched based on the cell being least likely to be occluded according to the solidity values.

The method may further include the step of, simultaneously with the fetching and prefetching steps, conservatively fetching geometry by first removing occluded cells from main memory and then fetching other cells. In that case, the occluded cells may be removed based on a least recently used replacement policy.

The method may also include the step of locking geometry during the fetching, prefetching and, optionally, the conservatively fetching steps to prevent those steps from operating on the same geometry. The fetching and prefetching steps may run as separate threads in a single processor.

The observer's predicted actual position may be determined based on the observer's current position and linear and angular velocity in the model. The prefetching step may include limiting the amount of geometry that can be prefetched for a single frame. The prefetching step may be performed only when the geometry cache is not full.

In another embodiment of the invention, a machine readable medium is provided containing configuration instructions for performing a method for managing a geometry cache as described.

BRIEF DESCRIPTION OF THE DRAWINGS

FIG. 3 is a table showing preprocessing statistics from a run of a program embodying of the invention.

DESCRIPTION OF THE INVENTION

The present application discloses a system that, besides rendering complex models composed of tens of millions of polygons at interactive frame rates, requires an order of magnitude less preprocessing time than previous systems, and works on a commodity single-processor PC equipped with an inexpensive graphics card. As a preprocessing step, the system creates a hierarchical representation of the input model. At runtime, the inventive system uses PLP (Prioritized Layered Projection), a real-time from-point visibility algorithm first described in J. T. Klosowski & C. T. Silva, The Prioritized-Layered Projection Algorithm for Visible Set Estimation, IEEE Transactions on Visualization and Computer Graphics 6, 2 (April–June 2000) 108–123; and J. T. Klosowski & C. T. Silva, Efficient Conservative Visibility Culling Using the Prioritized-Layered Projection Algorithm, IEEE Transactions on Visualization and Computer Graphics 7,4 (October–December 2001), 365379, the contents of each of which are hereby incorporated by reference in their entirety herein. The PLP algorithm is used in the presently described method to determine the potentially visible set. OpenGL is used to render the geometry in the visible nodes. The system maintains a cache of the nodes that are most likely to be visible, using threads to overlap rendering, computation, fetching, and speculative prefetching The threading hides the latency of the unavoidable I/O operations necessary to render models larger than main memory. By using a speculative prefetching strategy that works with from-point visibility algorithms, the present system overcomes the preconceived notion that from-region visibility algorithms must be used to perform prefetching.

Overview

Figure 1:
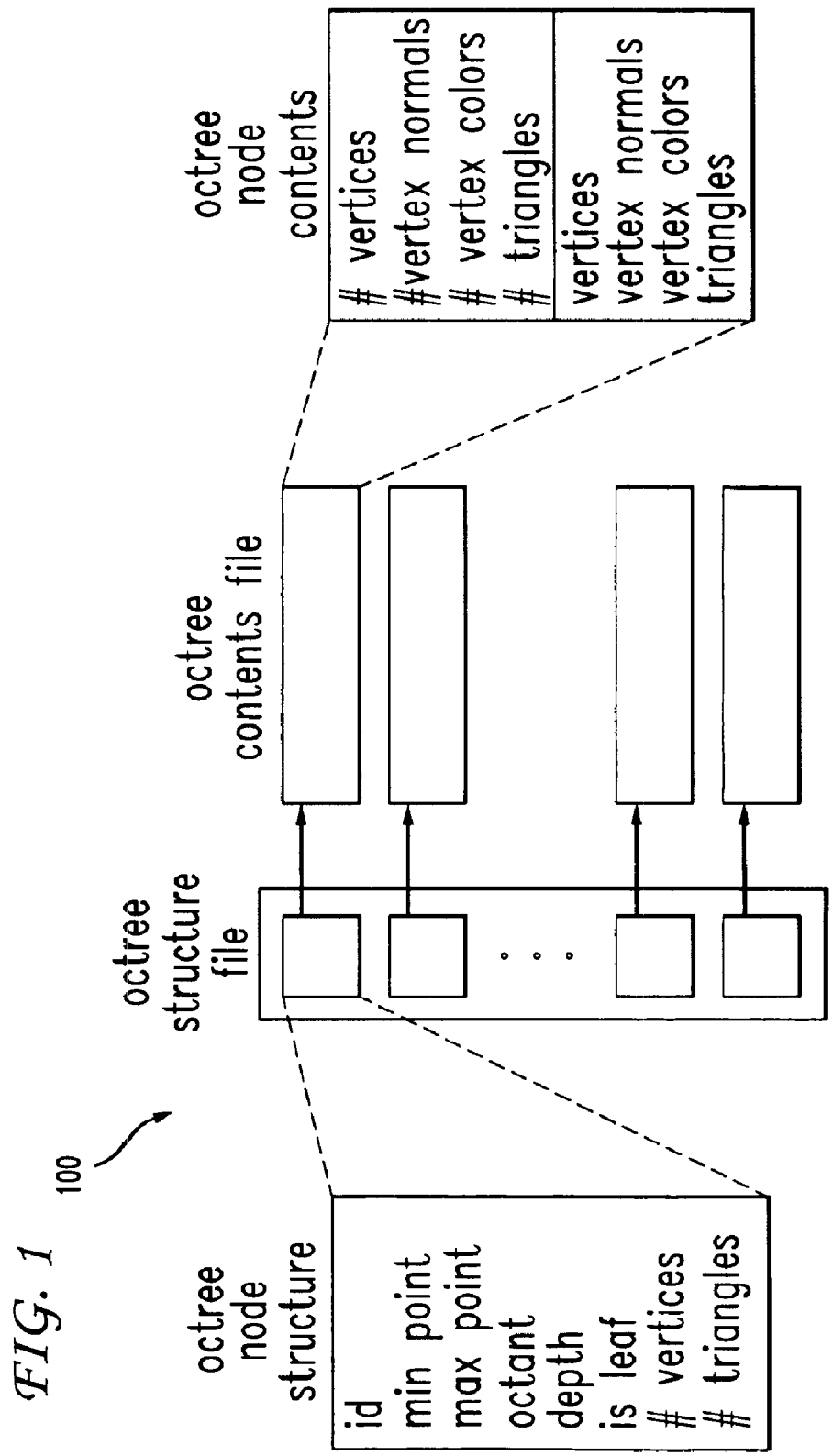
FIG. 1 is a schematic diagram of the file structure of the invention.

The presently described system allows a user to walk through a large model at interactive frame rates. For each new dataset, a one-time preprocessing step is required, which comprises creating a hierarchical spatial decomposition of the model, and storing it on disk. The details of the preprocessing algorithm are given later in this disclosure; a brief overview follows here. The preprocessing algorithm generates a set of files as byproducts. In particular, as shown in FIG. 1, a hierarchy-structure (HS) file 100 is generated. That file contains information about the spatial relationship of the different elements of the hierarchy. Specifically, for each cell, the HS file contains its (spatial) size and position, other auxiliary data (including the data needed to perform visibility culling), and pointers to another file that contains its subset of the input scene. The HS file contains the main data structure used by the presently described system to control the flow of data in the system. A key assumption is that the HS-file fits in memory. That is substantiated by the fact that even for the 13-million triangle UNC model, the HS file occupies roughly one megabyte of memory, without any space optimization.

Figure 2:
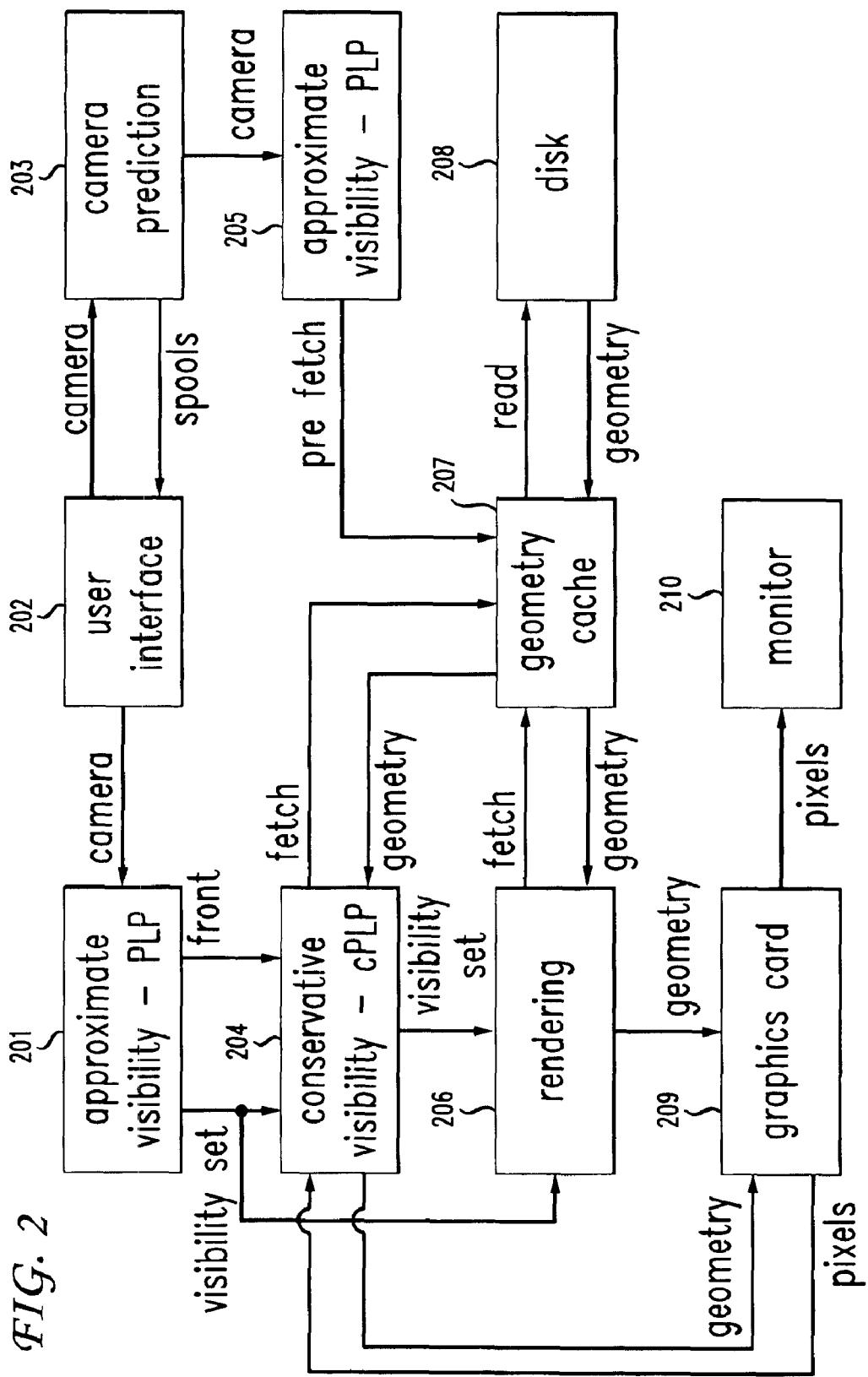
FIG. 2 is a block diagram showing program flow in an embodiment of the invention.

A diagram of inventive system showing the on-line rendering phase appears in FIG. 2. In an initial step 201, the PLP algorithm is used to determine approximate visibility. PLP is an approximate, from-point, object-space visibility algorithm. PLP may be thought of as a modification to the traditional view frustum culling algorithm. The traditional algorithm recursively traverses the model hierarchy from the root node down to the leaf nodes. If a node is outside the view frustum, that node and its children are ignored. If the node is inside or intersects the view frustum, its children are recursively traversed. The traversal eventually visits all leaves within the view frustum.

The PLP algorithm differs from the traditional one in several ways. First, instead of traversing the model hierarchy in a predefined order, PLP keeps the hierarchy leaf nodes in a priority queue called the "front," and traverses the nodes from highest to lowest priority. When a node is visited (or "projected"), it is visible, and is added to the visible set. The node is then removed from the front, and its layer of unvisited neighbors added to the front (hence, the algorithm's name: prioritized-layered projection). Second, instead of traversing the entire hierarchy, PLP works on a budget, stopping the traversal after a certain number of primitives have been added to the visible set. Finally, PLP requires each node to know not only its children, but also all of its neighbors. An implementation of PLP may be simple or sophisticated, depending on the heuristic to assign priorities to each node. Several heuristics precompute the initial solidity of a node, and accumulate the solidifies along a traversal path. The node's accumulated solidity estimates how likely it is for the node to occlude an object behind it. The key feature of PLP utilized in the present invention is that it can generate an approximate visible set without access to the actual scene geometry, i.e., it only requires the information that has (described in J. T. Klosowski & C. T. Silva, Efficient Conservative Visibility Culling, supra) which needs to use the scene geometry.

Referring to FIG. 2, for each frame, the user interface 202 sends the camera, i.e., the user's location and field of view, to the approximate visibility subsystem 201. The approximate visibility subsystem runs PLP to determine a guess of the potentially visible set. Recall that PLP keeps the hierarchy nodes in a priority queue called the front and traverses the nodes from highest to lowest priority, adding nodes to the visible set up to a predefined budget of primitives. The cPLP subsystem 204 can then be used to augment the approximate visible set found by PLP into a conservative one. There are many ways to implement cPLP, including exploiting new platform-dependent hardware extensions for visibility computation. The presently used implementation of cPLP uses an item-buffer technique that is portable to any system that supports OpenGL. Consequently, cPLP needs to fetch geometry from the geometry cache 207, and read pixels from the graphics card 209.

Note that running cPLP is optional, and the rendering subsystem 206 may choose between the visible sets from PLP 201 or cPLP 204. That flexibility allows the user to trivially switch between time-critical interactive (approximate) visualizations and accuracy-critical (conservative) visualizations. In either case, the rendering subsystem fetches the geometry of the visible set from the geometry cache 207, and sends it to the graphics card 209 for display 210. The geometry cache manages the memory available for geometry storage using a least recently used (LRU) replacement policy, and uses threads to perform asynchronous read operations from disk 208. The caching scheme is described in detail below. The user interface 202 also sends the camera information, along with the user's linear and angular speeds, to the camera prediction subsystem 203, which tries to guess where the user will be in the next few frames. The camera prediction subsystem then sends a set of cameras to another approximate visibility subsystem 205 running a separate PLP thread. This thread computes approximate visibility using those cameras, and sends the resulting visible sets to be prefetched by the geometry cache 207. The difference between fetching and prefetching a node is that prefetching does not affect the node's age, i.e., its priority for replacement. The details of the prefetching algorithm are described below.

Out-of-Core Processing

Presented in this section is an out-of-core algorithm to build a spatial hierarchical representation for a large model. The term bulk loading is often employed in the database literature to refer to the process of constructing an external data structure. Bulk loading techniques based on repeated insertion are often inefficient. An analysis of the efficiency of a top-down approach appears in P. Agarwal et al., A Framework for Index Bulk Loading and Dynamization, Proc. of ICALP '01 (1999). Given N, the number of input elements, M, the number of elements that fit in main memory, and B, the number of elements that fit in one disk block (with N much larger than M, and $1 \leq B \leq M/2$), Agarwal et al. show that the top-down approach is a factor of $\log_2 M$ bigger than optimal, thus requiring a substantial number of extra passes over the data. Agarwal et al. also give optimal bulk loading algorithms for a set of points.

To build an external data structure E, we propose a simple bulk loading algorithm that exploits the fact that we often want to insert a set of primitives P. One assumption of our algorithm is that the structure of E is negligible in size and fits in memory. If the size of |P|<M, then we insert P into E obtaining E' using a standard in-core algorithm such as that described in H. Samet, The Design and Analysis of Spatial Data Structures (Addison-Wesley 1990). The case in which the geometry does not fit in memory will be discussed below. Note that all the insertions happen in the leaves of E i.e., assuming the structure is of negligible size, the overall size of E' is still less than M. Note that none of the geometry that was originally in E was touched, since that would potentially increase the in-core size substantially. Because of that, there is still extra work to finish building E", the data structure that would result from in-core insertions. First it is determined which leaves of E' are modified versions of the corresponding leaf from E(because of insertions of P). Then, for each modified leaf $\mu$, we fetch its contents from disk once, and insert them on E'. Note that they have to necessarily belong to $\mu'$, since nothing was deleted. Also, during this insertion the contents will now descend to the correct leaf. When all the geometry from $\mu$ has been inserted on the subtree $\mu'$ (note that $\mu'$ might not necessarily be a leaf of E', but instead it might be an internal node), the contents is flushed of all its children, and the memory used by their geometry is deallocated.

After all the modified leaves have been patched, the structure of E' is transformed into E". E" can now be saved. Note that in that process only leaves from E that needed to be modified were fetched from disk. The total amount of memory used (again, ignoring the cost of the structure itself) is proportional to |P| plus the size of the largest original leaf $|\mu_{max}|$.

For the case that |P|>M, i.e., when the geometry to be inserted does not fit in memory, the technique described in Y.-J. Chiang et al., Interactive Out-of-Core Isosurface Extraction, IEEE Visualization '98 at 167–174 (October 1998), the contents of which is hereby incorporated by reference in its entirety, is used to split P into spatially coherent pieces that can be treated independently. In implementation, it is important to properly handle the case when the geometry to be inserted is outside the bounding box of the hiearchy. In that case, it is enough to grow until the hierarchy fits the bounding box of P.

Note that the presently-described out-of-core approach builds the model hierarchy directly on machines with small memory. In a currently preferred embodiment, an octree is used. Typically, the octree structure file is very small, and fits easily into main memory. The same is true for each octree node contents file separately. The algorithm has three important features:

First, it is an out-of-core algorithm. When processing a section, the algorithm requires only enough memory to hold the section itself, the octree structure, and the contents of one octree leaf. The section fits in memory by construction, the structure of the octree is small, and the size of the contents of a leaf is limited by the maximum number of vertices per leaf. Therefore, octrees can be created for extremely large data.

Second, it is an incremental algorithm. If new objects are added to the model, only the spatial regions touched by those objects need to be updated, as opposed to rebuilding the entire hierarchy. That is particularly useful for applications that build models incrementally, such as 3D scanning.

Third, it is fast. For each section, a modified node is read only once, thus performing the insertion in the most efficient way. The algorithm builds the octree for the UNC power plant in just 17 minutes.

Geometry Cache Management

Since the main memory on a PC is often not large enough to store the models of interest, the inventive system maintains a geometry cache of several octree leaf nodes within a portion of main memory. As the models are visualized, several of the subsystems request (the geometry within) the octree leaf nodes from the geometry cache. Those nodes are asynchronously read from disk and stored in the cache if they are not already present. Once the cache is full, the least recently used replacement policy determines which nodes to remove from the cache to make space available for newly requested nodes. Since the cost of disk read operations is high, most prior systems attempt to overlap those operations with other computations by running several processes on a multiprocessor machine or on a network of machines. In contrast, the system of the present invention uses threads on a single processor machine to perform the asynchronous I/O operations.

The geometry cache of the present invention uses a locking mechanism to prevent the multiple threads from modifying or deleting the same nodes. The requests may come from the conservative visibility subsystem 204 (FIG. 2), the rendering subsystem 206, or the prefetching subsystem 205. The locking mechanism is similar to that used by the UNIX operating system in its buffer cache. The locking mechanism of the present invention differs from that used by the UNIX buffer cache in that the UNIX buffer cache uses multiple processes for parallelism and signals for synchronization, while the present system uses threads and condition variables. Another difference is that the UNIX buffer cache uses buffers of fixed size, while the present invention uses variable size buffers.

One of the main responsibilities of the geometry cache of the presently described system is to fetch the octree nodes from disk that the subsystems will render for the current frame if the nodes are not already present. As requests for nodes come into the geometry cache 207, they are pushed onto a fetch queue FQ. That queue has a number of worker threads, each of which pops a request from FQ, reads the node from disk if it was not already in the cache (i.e., a cache miss), and signals the requestor that the node is now available. If the current cache is full, the least recently used replacement policy indicates which node should be replaced in the cache.

When the geometry cache is not full of nodes required for the current frame, another responsibility of the cache is to prefetch nodes that may be requested in the near future. That important responsibility is described in detail below.

The idea behind prefetching is to predict a set of nodes that the user is likely to see in the next few frames, and bring them to memory ahead of time. Ideally, by the time a user sees those nodes, they will already be in the geometry cache, and the frame rates will not be affected by the I/O latency. Prefetching has been used within prior systems, and to the inventors' knowledge, all previous strategies have been based on from-region visibility algorithms, and were designed to run on multiprocessor machines. The strategy of the present invention, on the other hand, works with from-point visibility algorithms, and runs as a separate thread in a uniprocessor machine. That approach exhibits several advantages over those previous techniques.

Most systems that use from-region visibility decompose the model into cells, and precompute for each cell the geometry that the user would see when located at the cell's centroid with a 360-degree field of view. At runtime, the from-region strategies try to predict in which cell the user will be next, and bring to memory the geometry visible from that cell ahead of time. That approach has several potential problems including: (a) unnecessary restrictions on the geometry (e.g., cells must coincide with axis-aligned polygons in the model), (b) long preprocessing times, (c) overestimation of the visible geometry due to the 360-degree field of view, (d) inaccuracies caused by choosing the cell's centroid as the representative point from which visibility is precomputed, and (e) drops in frame rate due to bursts of I/O activity when the user crosses cell boundaries (and the visible geometry drastically changes).

Some systems that use from-region visibility avoid the dips in frame rates by trading accuracy for interactivity, and establish a maximum number of I/O operations per frame. In one example, after the frame runs out of I/O operations, if an object is not in memory at any LOD, it is skipped completely. While that approach guarantees constant frame rates, which was the goal of that work, there is no guarantee of image quality.

The presently described system avoids many of the potential problems of the from-region approaches by using a from-point strategy that exploits the strengths of the PLP algorithm. Recall that for each frame, PLP computes a priority queue (the front F) with the nodes that are likely to be visible from the user's current point of view. PLP adds the nodes in the front that are most likely to be visible to its approximate visible set V, up to a given budget (of time or geometry).

Referring to FIG. 2, for each frame, the nodes in V (whether computed by PLP 205 or by cPLP 204) are fetched from disk to the geometry cache 207, if they are not already present. At the same time, the system searches for candidate nodes for prefetching in several places. Due to frame-to-frame coherence, the nodes remaining in the front for the current frame are likely to be in the front (or even the visible set) for the next frame. If the current PLP front is empty (because the system is running in conservative mode), or the remaining nodes in the front are already in memory, the system also considers prefetching the neighbors of the nodes that were in the front, as those nodes are the next most likely nodes to be visible from the current viewpoint. Although coherence suggests those alternatives would work well, the inventors have determined that those alternatives do not work as well as the following preferred alternative.

That alternative exploits the fact that PLP can run in real-time, and determine the approximate visible set for a guess of the user's next view position. That guess is computed based on the user's current position and linear and angular velocities. Provided the estimation of the next viewpoint is reasonable, prefetching the approximate visible set for this viewpoint has resulted in fewer cache misses for subsequent viewpoints. For each node found to be a prefetching candidate, the system sends a prefetch request to the geometry cache, which reads the node as time permits, without changing the node's priority for replacement. A limit is imposed on the amount of geometry that can be prefetched in any one frame. The from-point strategy addresses most of the potential problems with the from-region strategies: (a) it imposes no restriction on the model's geometry; (b) it requires very little processing; (c) it uses exactly the field of view of the current camera; (d) it uses the user's exact location for visibility computations; and (e) it exploits frame-to-frame coherence (even across node boundaries) to reduce bursts of I/O activity.

Experimental Results

In order to evaluate the system of the invention, the inventors used a 13 million triangle power plant model from the Walkthru Project at University of North Carolina. The model is available at http://www.cs.unc.edu/~geom/Powerplant/. That model contains interesting geometry, and it poses substantial preprocessing and rendering challenges. Because its geometry contains several layers, it poses a particular challenge to rendering systems that do not use occlusion culling techniques. Also, because the dataset is not really over tessellated, it limits the effectiveness of simple level-of-detail techniques. The dataset requires multiple gigabytes of main memory, thus requiring some form of out-of-core technique for its processing on PCs. To the inventors' knowledge, no other system has been able to render this model at interactive rates on a single PC.

In the following sections, the performance of the preprocessing algorithm is presented and rendering results are discussed. All of the results were obtained by running the system tools on Linux PCs (RedHat 7.2).

Preprocessing was performed on a 900 MHz AMD Athlon with 512 MB of main memory, a 400 GB disk array composed of eight SCSI disks configured as two 200 GB stripped disks. The UNC power plant model consists of 21 sections, each of which fit in the memory of the test machine. The out-of-core incremental algorithm was used to build the hierarchy for the entire model, one section at a time.

A summary of the preprocessing statistics is shown in table 300 of FIG. 3. Those statistics represent the out-of-core incremental construction of the octree for the UNC power plant, with each row showing data from one of the 21 sections. Although the final octree contents were 3.9 GB (entry 310), the structure was only 1 MB (entry 311). The process took 17 minutes (entry 312) and at most 214 MB of memory (entry 313).

In building the octree, the inventors set a limit of 15,000 vertices per leaf (equivalent to 5,000 triangles per leaf); the resulting octree has 19,693 leaves. The size of the octree structure was only 1 MB, and the largest contents file is only 600 KB. Thus, after those files have been created, even a machine with small memory could use them for rendering. As noted above, being able to keep the octree structure in memory is critical for the incremental construction of the octree contents. The octree structure is necessary for many operations that do not depend on the octree contents, e.g., running PLP. The maximum amount of memory ever needed in the described implementation was 214 MB, even though the contents of the final octree were 3.9 GB. That is a key point: the inventors were able to build a large octree using a modest PC with small memory. If the PC had less memory than 214 MB, the model would have been broken down into smaller sections, as discussed above. The total preprocessing time was only 17 minutes, which is an order of magnitude better than the best previously reported results for the example model. The complete octree has a replication factor of 2.6; i.e., each triangle intersects an average of 2.6 octree leaf nodes (and is stored in each of them). That is undesirable, but not a critical problem. The solution would be storing geometry in internal nodes as well as the leaves, and would keep a triangle in the smallest node that fully contains it.

The sample run was made on a 900 MHz AMD Athlon with 128 MB of main memory, one IDE 30 GB disk, and nvidia GeForce2 graphics. That machine ran RedHat 7.2, and the latest version of the video driver. Using top, it was determined that the operating system and related utilities (including the X server) uses roughly 64 MB of main memory when idle. There are many parameters that may be configured in the system of the invention, including: geometry cache size, number of threads for asynchronous fetching, number of threads for speculative prefetching, maximum amount of data to be prefetched per frame, visibility mode (approximate or conservative). It was found that the following configuration works well in practice: 32 MB geometry cache, 8 threads for asynchronous fetching, one thread for speculative prefetching with a budget of 1 MB per frame (i.e., for ten frames per second, the system uses up to 10 MB/s of disk throughput), and approximate visibility with a budget of 140,000 triangles per frame. All of the results presented here were rendered at a resolution of 1024×768.

In order to study the overall feel of the system, the inventors rendered a large path containing 36,432 camera positions and requiring the overall fetching of 1.6 GB of data from the disk. Using the configuration shown above, the system renders that path in less than one and a half hours. The median frame rate was 9.1 fps, while the average is slightly slower at 8.25 fps; i.e., the frame rates are close to the target rate of ten (a number that is mainly dictated by disk and rendering performance). A small number of views (147 or 0.4%) cause the system to choke and achieve less than one frame per second. The use of approximate visibility causes some visual artifacts as some objects occasionally pop in and out of view because of visibility computation mistakes (see the analysis below for a shorter path).

Shorter paths were used to analyze the detailed performance of the system. Specifically, a 500-frame path was used, requiring 210 MB of data being read from disk. If fetched independently, the maximum amount of memory necessary to render any given frame using PLP would be 16 MB. In order to study the behavior of the geometry caching and prefetching, tests were run using three different configurations. The first configuration is entirely sequential. A single thread is responsible for computation, I/O, and rendering. The second configuration adds asynchronous fetching to the first configuration, allowing up to 8 reader threads. The third adds an extra thread for speculative prefetching to the second configuration, allowing up to 1 MB of geometry to be prefetched per frame.

Figure 4A:
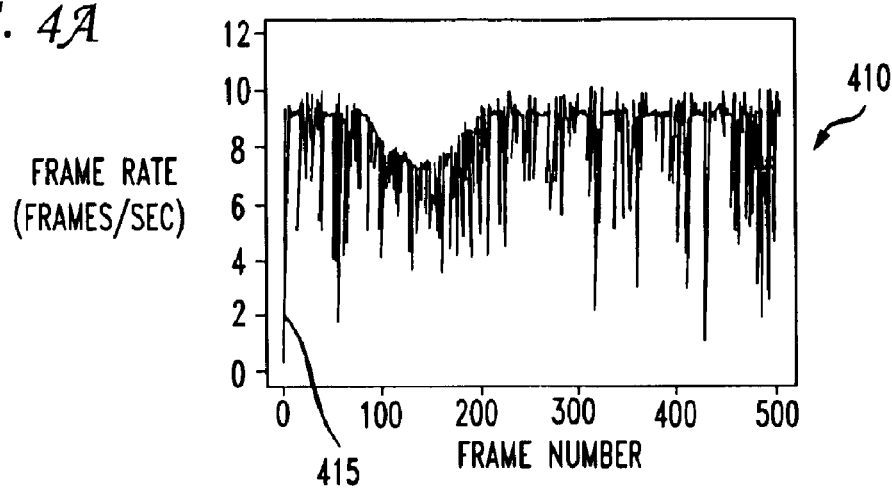
FIGS. 4A–4C are graphs showing frame rates during runs of a rendering program using various levels of prefetching.
Figure 4B:
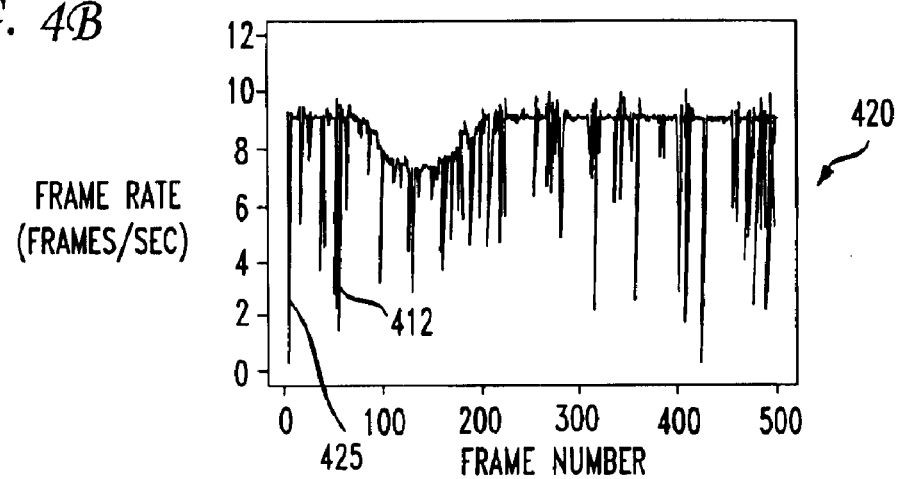
Figure 4C:
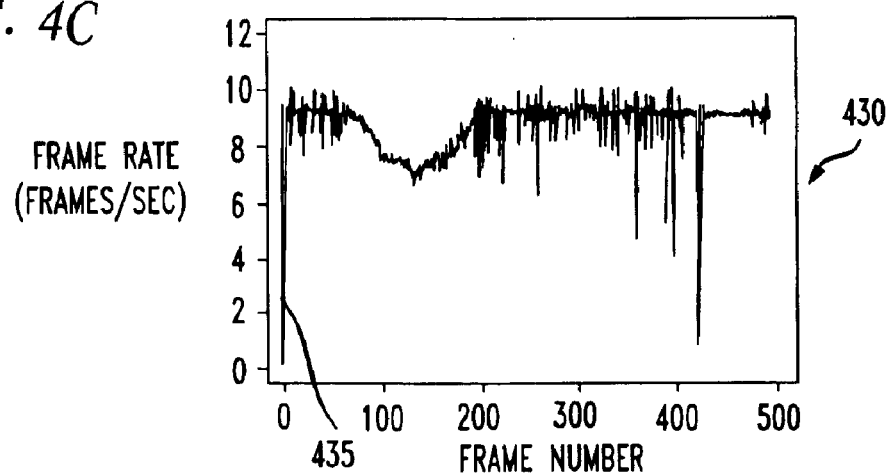

FIGS. 4A, 4B and 4C shows the frame rates achieved by those three configurations for a pre-recorded path of 500 frames. The effect of prefetching on frame rate is clearly visible. Graph 410 of FIG. 4A shows the frame rates for a 500-frame walkthrough of the power plant model using a single thread. For that purely sequential configuration, many downward spikes such as spike 415 may be seen that correspond to abrupt drops in frame rates. Those, in turn, are caused by the latency of the I/O operations. The drops in frame rates spoil the user's experience. Graph 420 of FIG. 4B shows a walkthrough with added threads for asynchronous fetching. Asynchronous fetching eliminates some downward spikes, but many still remain. The user's experience is considerably better, but the frame rate drops are still disturbing. Graph 430 of FIG. 4C shows added threads for speculative prefetching. It can be seen that speculative prefetching eliminates almost all of the remaining downward spikes, and the user experience is smooth. Note that the gain in interactivity comes entirely from overlapping the independent operations. The first downward spikes 415, 425, 435 occur because the cache is empty in the first frame.

Figure 5:
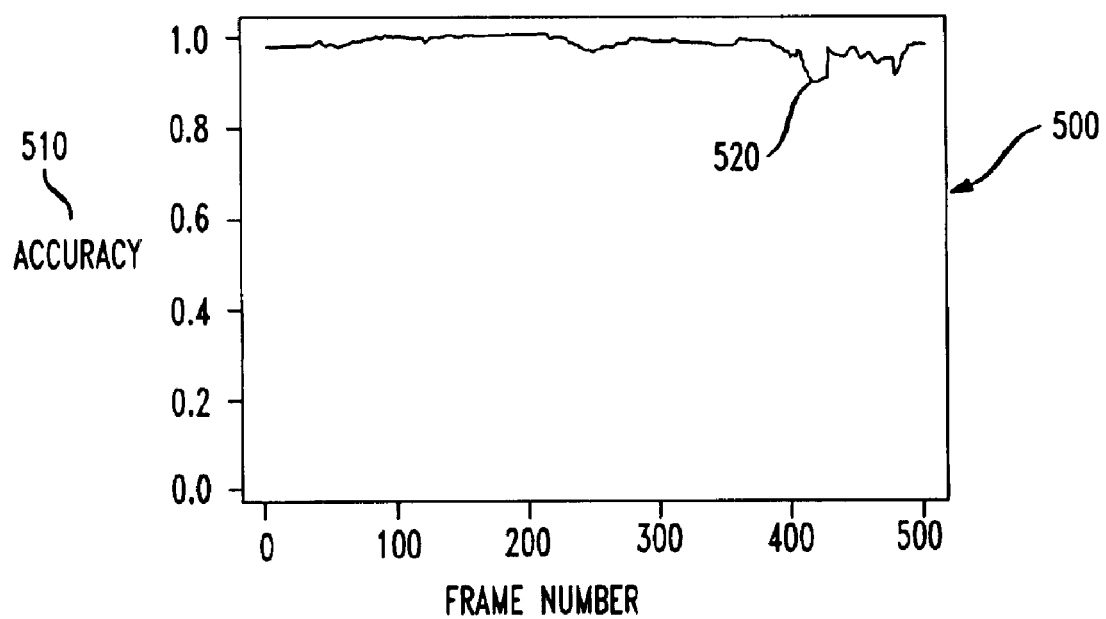
FIG. 5 is a graph showing image accuracy during a run of a rendering program using the methods of the invention.

The three configurations produce identical images. In particular, graph 500 of FIG. 5 shows the accuracy they achieve in a 500-frame walkthrough of the power plant model when using approximate visibility. The vertical axis 510 represents the fraction of correct pixels in the images produced by PLP when compared to the correct image. On average, PLP rendered images with 97.6% of the pixels correct; in the worst case 520, an image with 88.9% accuracy was rendered. Further gains in interactivity may be obtained at the cost of compromised image quality.

Figure 6A:
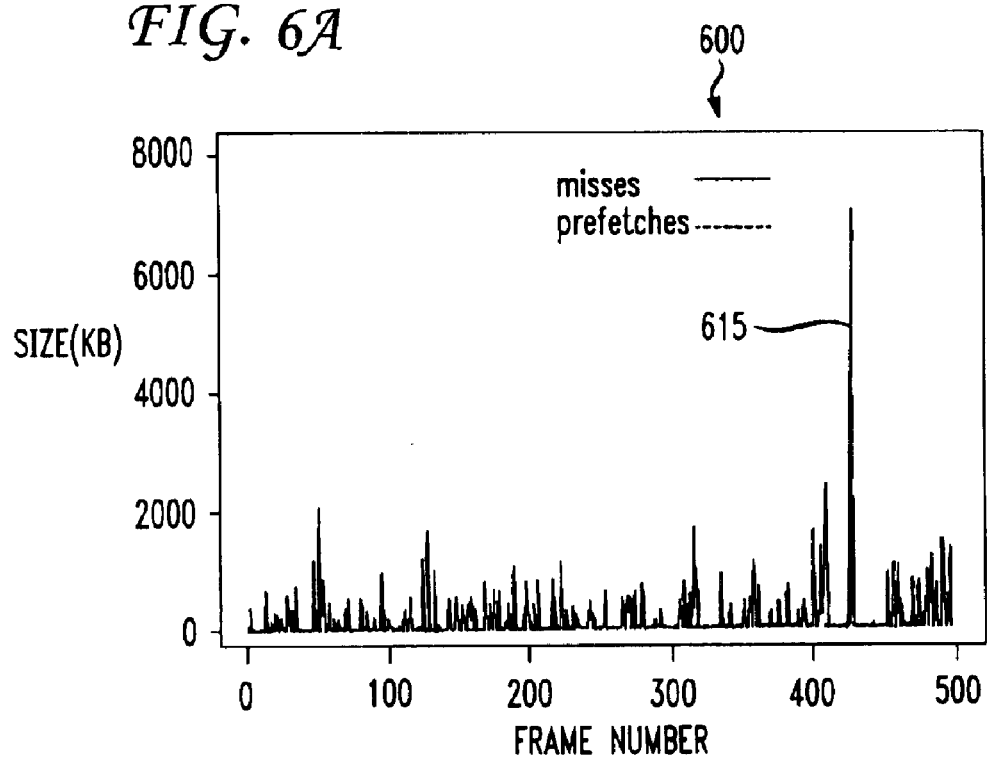
FIGS. 6A and 6B are graphs showing the amount of geometry fetched and prefetched during runs of a rendering program with and without prefetching.
Figure 6B:
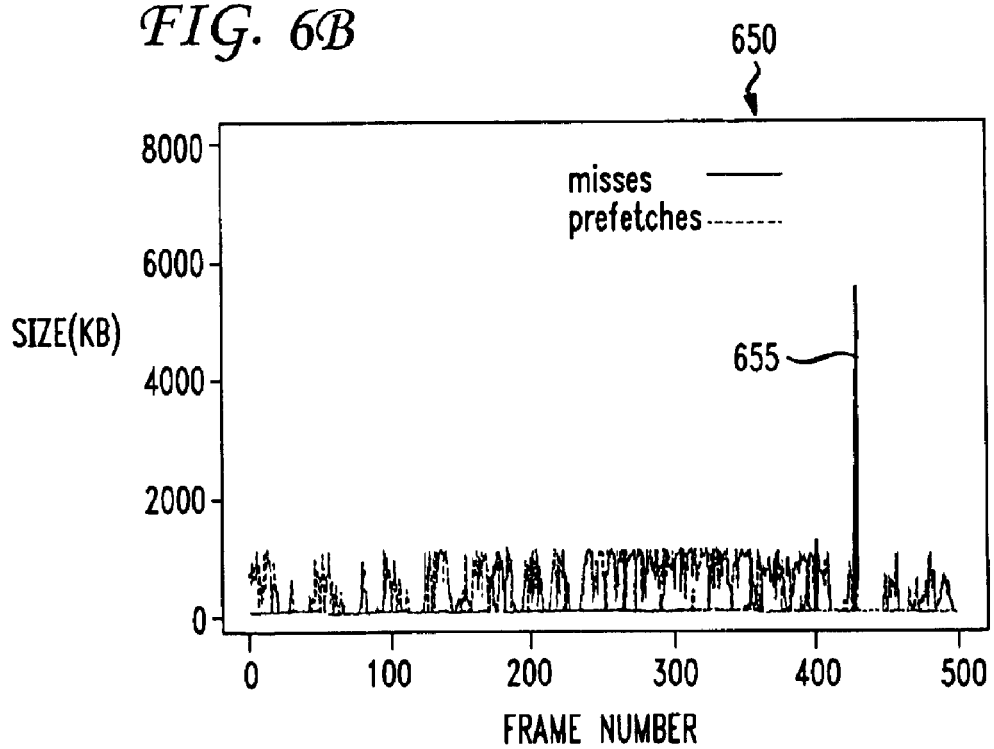
Figure 7A:
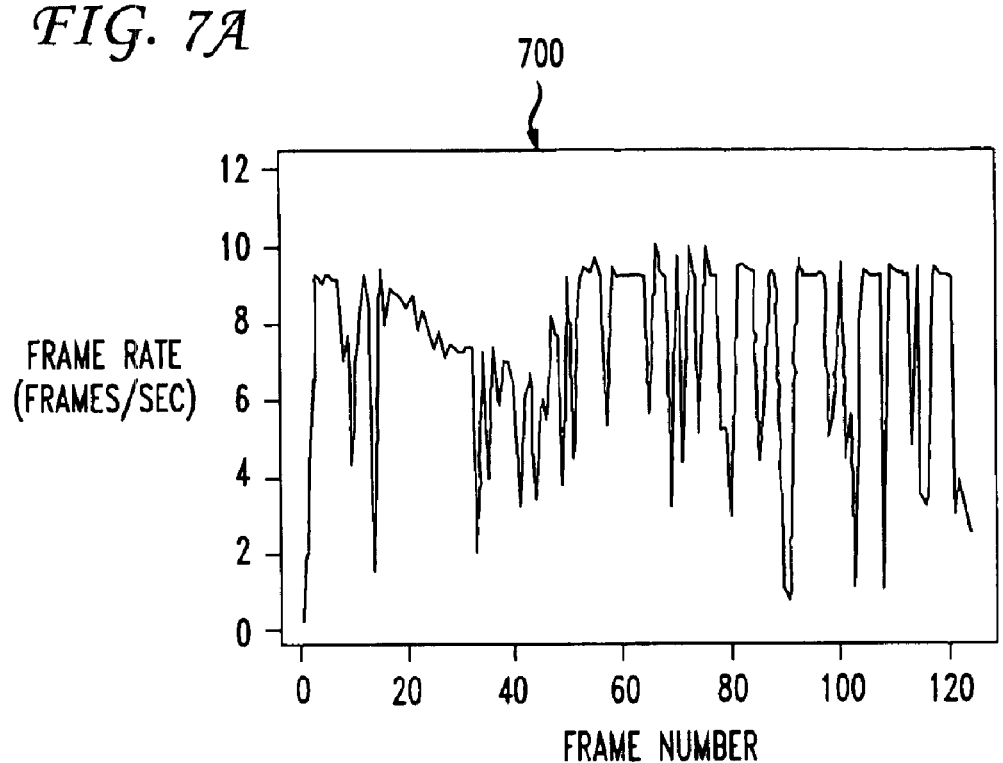
FIGS. 7A–7D are graphs showing frame rates during runs of a rendering program using various levels of user speed.
Figure 7B:
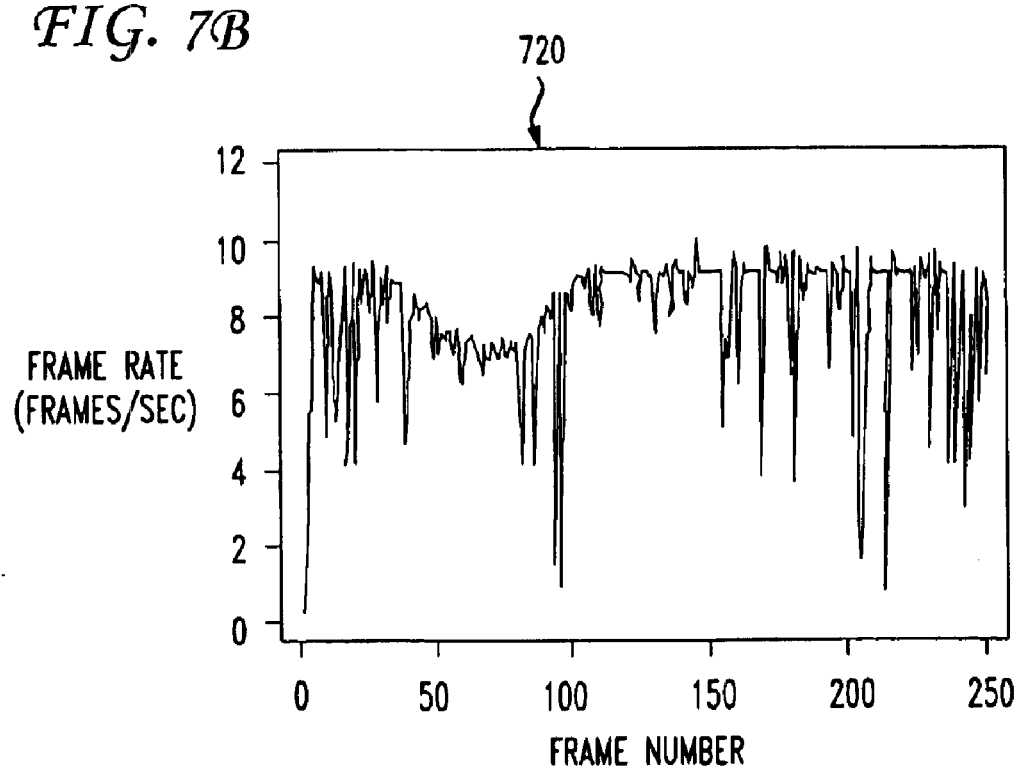
Figure 7C:
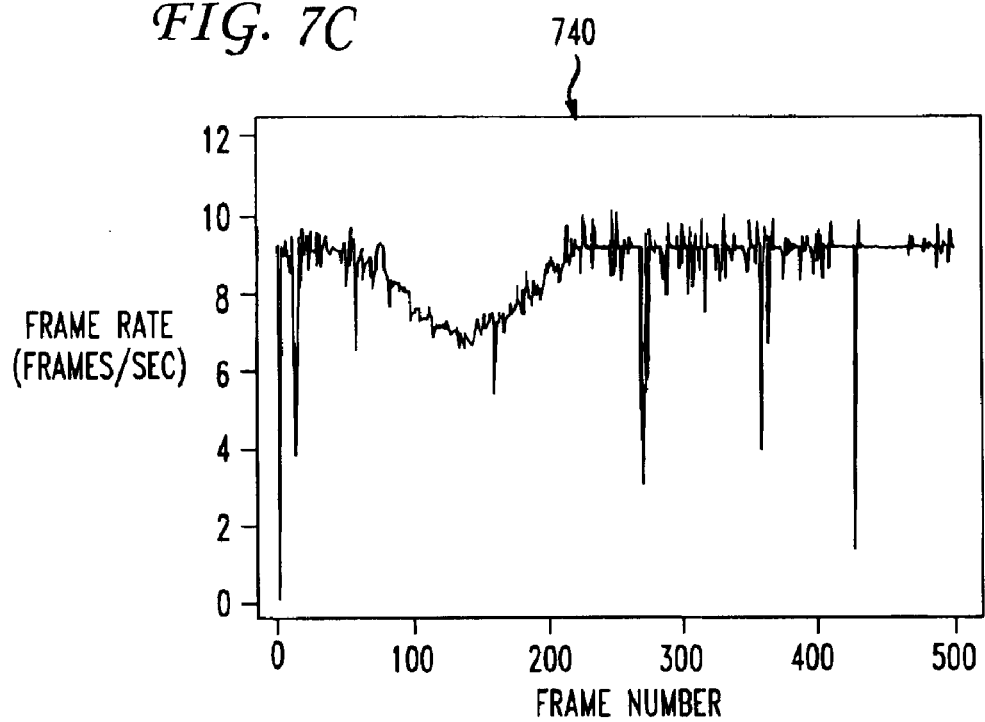
Figure 7D:
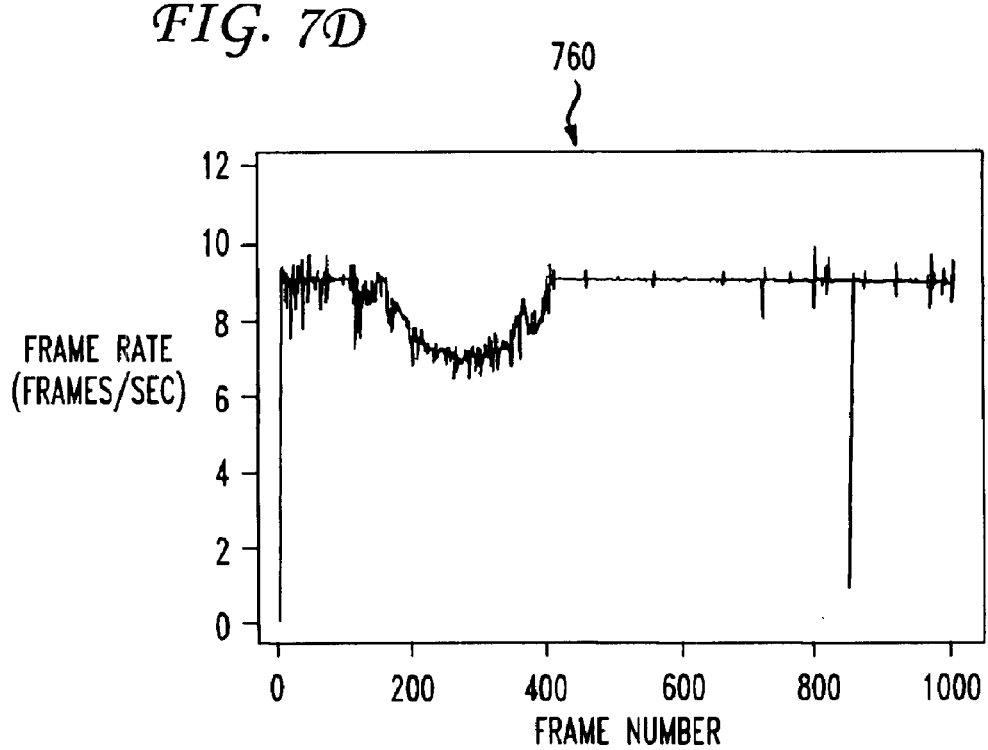

FIGS. 6A and 6B show the amount of I/O needed for each frame. Specifically, an amount (in KB) of geometry is shown that was fetched (black) and prefetched (gray) by the system. In graph 600, shown in FIG. 6A, only fetching was used. In graph 650, shown in FIG. 6B, the prefetching scheme has been added. The fetches (which require in-frame disk I/O, and potentially stall the rendering pipeline) are greatly reduced, as shown by the low number of black spikes as compared to those appearing in graph 600. The big spikes 615, 655 represent a huge change in visibility that was not prefetched. Even in that case, note that prefetching lowered the spike 655 as compared to spike 605 without prefetching. The system used to generate the data was configured to prefetch at most 1 MB per frame. By prefetching nodes, the system greatly reduces the need to fetch large amounts of geometry for a single frame, and thus maintains higher frame rates.

FIG. 7 shows the relationship between disk I/O and user speed. The figures show the effect of changing the user speed by showing the effect of changing the number of frames in the path from 125 frames (graph 720 of FIG. 7A), 250 frames (graph 740 of FIG. 7B), 500 frames (graph 760 of FIG. 7C), and 1000 frames (graph 780 of FIG. 7D). Moving too fast while trying to achieve 10 fps is not possible since it requires too much disk I/O, leading to substantial drop in frame rates. Decreasing the user speed (right) leads to better results.

The inventors have found that prefetching is much more effective if the user moves at a speed that is compatible with the disk I/O performance. When the user moves quickly, almost all of the visible geometry must be fetched from disk, thereby preventing the prefetching thread from loading the upcoming visible nodes. As the user's speed decreases, the amount of geometry fetched from disk per frame also decreases, thereby allowing the prefetch thread time and disk bandwidth to preload geometry for subsequent frames.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method for managing a geometry cache for rendering a view of a spatial model from a position of an observer, the method comprising:

fetching geometry based on a from-point visibility algorithm;

determining a predicted position of the observer based on a current position of the observer and linear and angular velocity in the model; and prefetching geometry that is identified for prefetching based on a limited field of view from a single point located at the predicted position of the observer.

2. The method of claim 1, wherein the spatial model comprises cells including geometry and having solidity values, and wherein the fetching step act includes selecting a cell to be fetched based on said cell being least likely to be occluded according to the solidity values.

3. The method of claim 2, further comprising fetching geometry by first removing occluded cells from main memory and then fetching other cells.

4. The method of claim 3, wherein the occluded cells are removed based on a least recently used replacement policy.

5. The method of claim 3, further comprising locking geometry during the fetching, the prefetching and the second fetching acts to prevent those acts from concurrently operating on a same geometry.

6. The method of claim 1, further comprising locking geometry during the fetching and the prefetching acts to prevent both of the acts from concurrently operating on a same geometry.

7. The method of claim 1, wherein the fetching and the prefetching acts run as separate threads in a single processor.

8. The method of claim 1, wherein the prefetching act includes limiting an amount of geometry that can be prefetched for a single frame.

9. The method of claim 1, wherein the prefetching act is performed only when the geometry cache is not full.

10. A machine readable medium including configuration instructions for performing a method for managing a geometry cache for rendering a view of a spatial model from a position of an observer, the method comprising:

fetching geometry based on a from-point visibility algorithm;

determining a predicted position of the observer based on a current position of the observer and linear and angular velocity in the model; and prefetching geometry that is identified for prefetching based on a limited field of view from a single point located at the predicted position of the observer.

11. The medium of claim 10, wherein the spatial model comprises cells including geometry and having solidity values, and wherein the fetching act includes selecting a cell to be fetched based on said cell being least likely to be occluded according to the solidity values.

12. The medium of claim 11, wherein the method further comprises fetching geometry by first removing occluded cells from main memory and then fetching other cells.

13. The medium of claim 12, wherein the occluded cells are removed based on a least recently used replacement policy.

14. The medium of claim 12, wherein the method further comprises locking geometry during the fetching, the prefetching and the second fetching acts to prevent those acts from concurrently operating on a same geometry.

15. The medium of claim 10, wherein the method further comprises locking geometry during the fetching and the prefetching acts to prevent both of the acts from concurrently operating on a same geometry.

16. The medium of claim 10, wherein the fetching and the prefetching acts run as separate threads in a single processor.

17. The medium of claim 10, wherein the prefetching act includes limiting an amount of geometry that can be prefetched for a single frame.

18. The medium of claim 10, wherein the prefetching act is performed only when the geometry cache is not full.

* * * * *